(12) United States Patent
Nakamura et al.

(10) Patent No.: US 7,773,068 B2
(45) Date of Patent: Aug. 10, 2010

(54) DISPLAY DEVICE

(75) Inventors: Takashi Nakamura, Saitama (JP); Takayuki Imai, Fukaya (JP); Hirotaka Hayashi, Fukaya (JP); Norio Tada, Kumagaya (JP); Hiroki Nakamura, Ageo (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 678 days.

(21) Appl. No.: 11/695,239

(22) Filed: Apr. 2, 2007

(65) Prior Publication Data

US 2008/0018612 A1 Jan. 24, 2008

(30) Foreign Application Priority Data

Jul. 24, 2006 (JP) ............................. 2006-200831

(51) Int. Cl.
  *G09G 3/36* (2006.01)
  *G06F 3/041* (2006.01)
(52) U.S. Cl. ....................... 345/104; 345/173
(58) Field of Classification Search ........... 345/87–102, 345/173–178; 178/18.01–18.11
See application file for complete search history.

(56) References Cited

U.S. PATENT DOCUMENTS 6,825,828 B2 * 11/2004 Burke et al. ................ 345/102
7,002,555 B1 * 2/2006 Jacobsen et al. ............ 345/173
7,009,663 B2 * 3/2006 Abileah et al. ............. 345/175
7,586,479 B2 * 9/2009 Park et al. .................. 345/173
2006/0097975 A1 5/2006 Lee et al.
2006/0146035 A1 * 7/2006 Cha et al. .................. 345/173
2008/0062116 A1 * 3/2008 Morbieu et al. ............ 345/102

FOREIGN PATENT DOCUMENTS

JP 2006-91897 4/2006

OTHER PUBLICATIONS

U.S. Appl. No. 11/868,126, filed Oct. 5, 2007 Nakamura, et al.
U.S. Appl. No. 12/026,814, filed Feb. 6, 2008 Nakamura, et al.

* cited by examiner

*Primary Examiner*—David L Lewis
(74) *Attorney, Agent, or Firm*—Oblon, Spivak, McClelland, Maier & Neustadt, L.L.P.

(57) ABSTRACT

In order to improve accuracy in determining whether or not an object touches a display screen, a display device includes a display unit and a processor. The display unit includes an image display unit which displays an image on a display screen, an optical input unit which picks up an image of an object adjacent to the display screen and a capacitive coupling detector which detects a capacitive coupling to the object adjacent to the display screen. The processor determines that the object touches the display screen by using, and concurrently calculates the coordinates touched by the object by using the capacitive coupling detected by the capacitive coupling detector, and the image picked up by the optical input unit.

5 Claims, 12 Drawing Sheets

| 151 | 152 | 153 |
|-----|-----|-----|
| 154 | 155 | 156 |
| 157 | 158 | 159 |

//  # DISPLAY DEVICE

CROSS-REFERENCE TO RELATED APPLICATIONS

This application is based upon and claims the benefit of priority from Japanese Patent Application No. 2006-200831 filed Jul. 24, 2006; the entire contents of which are incorporated herein by reference.

BACKGROUND OF THE INVENTION

1. Field of the Invention

The present invention relates to a display device provided with an optical input function for obtaining information from a display screen by using light.

2. Description of the Related Art

In recent years, as a display device used for various devices such as a cellular phone and a laptop computer, a liquid crystal display device is widely used. In a display unit of a liquid crystal display device, a plurality of scan lines and a plurality of signal lines are arranged so that each scan line intersects each signal lines. In addition, pixels, each of which includes a thin film transistor, a liquid crystal capacitance and an auxiliary capacitance, are provided respectively to the intersections. The liquid crystal display device is provided with a drive circuit which drives each scan line and each signal line.

As a display device, which includes photosensors arranged in pixels, and which thereby is capable of obtaining information from a display screen by using light, for example, there is one described in Japanese Patent Application Laid-open Publication No. 2006-91897.

In such a display device, for example, photodiodes are provided as photosensors respectively in pixels, and a capacitor is connected to each of the photodiodes. In the display device, the amount of charge in each of the capacitors is changed according to the amount of light which enters from a display screen, and which is received by the corresponding photodiode. In this state, by detecting voltages on both sides of each of the capacitors, the display device generates data on a picked-up image, and thus captures the image.

As an application of such a display device, a device incorporating a touch panel or a digitizer has been proposed. The touch panel allows a user to input information to the device by detecting a shadow of an object such as a finger, which is projected onto a display screen. The digitizer allows a user to input information to the device by detecting light radiated from an illuminating object, such as a light pen.

However, in the case of such a conventional display device having an optical input function, ambient light conditions such as lighting sometimes makes it difficult to distinguish a case where a finger or the like actually touches a display screen, form a case where the finger or the like is merely in the air above the display screen. This leads to an incorrect input.

SUMMARY OF THE INVENTION

An object of the present invention is to improve accuracy in determining whether or not an object touches a display screen in a display device having an optical input function.

A first aspect of the present invention is a display device including a display unit and a processor. The display unit includes an image display unit, an optical input unit and a capacitive coupling detector. The image display unit displays an image on a display screen. The optical input unit picks up an image of an object adjacent to the display screen, and the capacitive coupling detector detects a capacitive coupling to the object adjacent to the display screen. The processor determines that the object touches the display screen by using, and concurrently calculates the coordinates touched by the object by using the capacitive coupling detected by the capacitive coupling detector, and the image picked up by the optical input unit.

According to the first aspect of the present invention, for example, the capacitive coupling detector detects the capacitive coupling to an object adjacent to the display screen. Thereby, when the detected capacitive coupling is large, the processor determines that the object touches the display screen, and concurrently calculates the coordinates touched by the object. This makes it possible to improve accuracy in obtaining the timing and the coordinates, at which an object touches a display screen.

A second aspect of the present invention is the display device of the first aspect, which further includes a power supply unit. The power supply unit applies a voltage. The capacitive coupling detector includes a sensor capacitance element. The power supply unit applies a precharge voltage and a reference voltage respectively to two electrodes of the sensor capacitance element. Here, the precharge voltage and the reference voltage have voltage values oscillating in the same phase. The capacitive coupling detector detects the capacitive coupling according to a change in the potential difference across the precharged sensor capacitance element.

According to the second aspect, when the magnitude of the capacitive coupling of the sensor capacitance element to the object adjacent to the display unit is large, the measured potential difference across the sensor capacitance element changes according to the timing of precharging. For this reason, on the basis of the amount of the change in the potential difference, the magnitude of the capacitive coupling can be detected.

A third aspect of the present invention is the display device of the second aspect having the following feature. In the display device of the third aspect, the optical input unit includes an optical sensor connected to the sensor capacitance element in parallel. The processor determines the magnitude of the capacitive coupling by using, and calculates the coordinates touched by the object by using a differential image obtained from a difference between an image of a current frame and an image of the immediately previous fame, the images picked up by the optical input unit.

According to the third aspect, the sensor capacitance element and the photosensor, both of which are included in the capacitive coupling detector, are connected to each other in parallel. With this configuration, when an object touches the display screen, the measured potential difference between electrodes of the sensor capacitance element changes according to the timing of measurement, and thereby the output value from the optical input unit changes. For this reason, by detecting a difference between frames with respect to images picked up by the optical input unit, it is possible to detect, as a region touched by an object, a region where the potential difference between the electrodes of the sensor capacitance element changes. In addition, a timing and coordinates at which the object touches the display screen are calculated on the basis of the thus detected region touched by the object. This makes it possible to improve the accuracy of this calculation.

A fourth aspect of the present invention is the display device of the second aspect having the following features. In the display device of the fourth aspect, the display unit is formed on a glass substrate. The precharge voltage is applied to a first one of the two electrodes of the sensor capacitance element, the first electrode being formed closer to the glass substrate.

According to the fourth aspect, the precharge voltage is applied to the first electrode, which is closer to the display screen touched by the object, of the two electrodes of the sensor capacitance element. This facilitates a coupling of the object to the first electrode to which the precharge voltage is applied.

The first electrode, to which the precharge voltage is applied, preferably has an area larger than the second electrode, from the point of view of facilitating a capacitive coupling of an object to the sensor capacitance element.

The first electrode, to which the precharge voltage is applied, is preferably formed of polysilicon, from the point of view of securing a transmittance of a pixel of the display device.

DESCRIPTION OF THE EMBODIMENT

Descriptions will be given below of an embodiment of the present invention by referring to the accompanying drawings.

Figure 1:
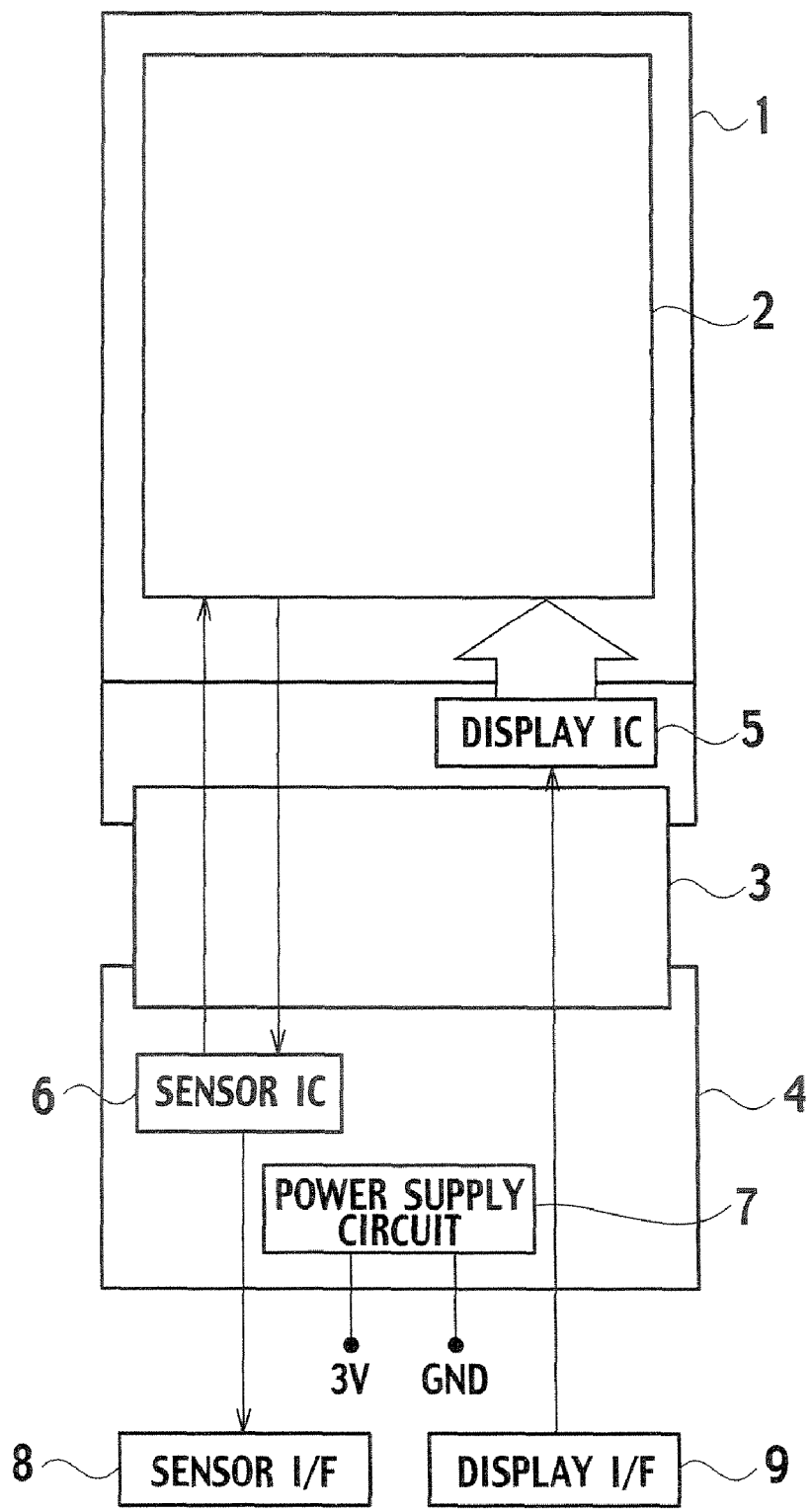
FIG. 1 is a plan diagram showing a configuration of a display device of an embodiment.

FIG. 1 is a plan diagram showing a configuration of a display device according to the embodiment of the present invention. The display device shown in FIG. 1 includes a display unit 2, a display IC (Integrated Circuit) 5, a drive substrate 4, a sensor IC 6, a power supply circuit 7, a flexible substrate 3, a display I/F (Interface) 9 and a sensor I/F 8. The display unit 2 is formed on a glass substrate of an array substrate 1. The display IC 5 is mounted on the array substrate 1 by using COG (Chip On Glass). The sensor IC 6 and the power supply circuit 7 are disposed on the drive substrate 4. The flexible substrate 3 connects the array substrate 1 and the drive substrate 4. Incidentally, the sensor IC 6 may be mounted on the array substrate 1 by using COG.

In the display unit 2, a plurality of scan lines and a plurality of signal lines are arranged so that each scan line intersects each signal line, and pixels are provided respectively to the intersections. This display unit 2 includes an image display unit, an optical input unit and a capacitive coupling detector. The image display unit displays an image on the basis of an image signal transmitted from a host side through the display I/F 9 and the display IC 5. The optical input unit picks up an image of an external object approaching a display screen. The capacitive coupling detector detects a capacitive coupling. Incidentally, in the display unit 2 shown in FIG. 1, 240 (in a lateral direction)×320 (in a longitudinal direction) pixels are disposed in a matrix.

The sensor IC 6 (a processor) outputs a control signal for driving the optical input unit and the capacitive coupling detector of the display unit 2. The sensor IC 6 receives and processes an image picked up in the display unit 2. Then, to the host side through the sensor I/F 8, the sensor IC 6 transmits information on whether or not a user touches the display unit 2, and the coordinates in the display unit 2 to which the user is adjacent. The sensor IC 6 includes various kinds of image processing blocks such as a difference processing circuit which calculates the difference between frames of a picked-up image.

Figure 2:
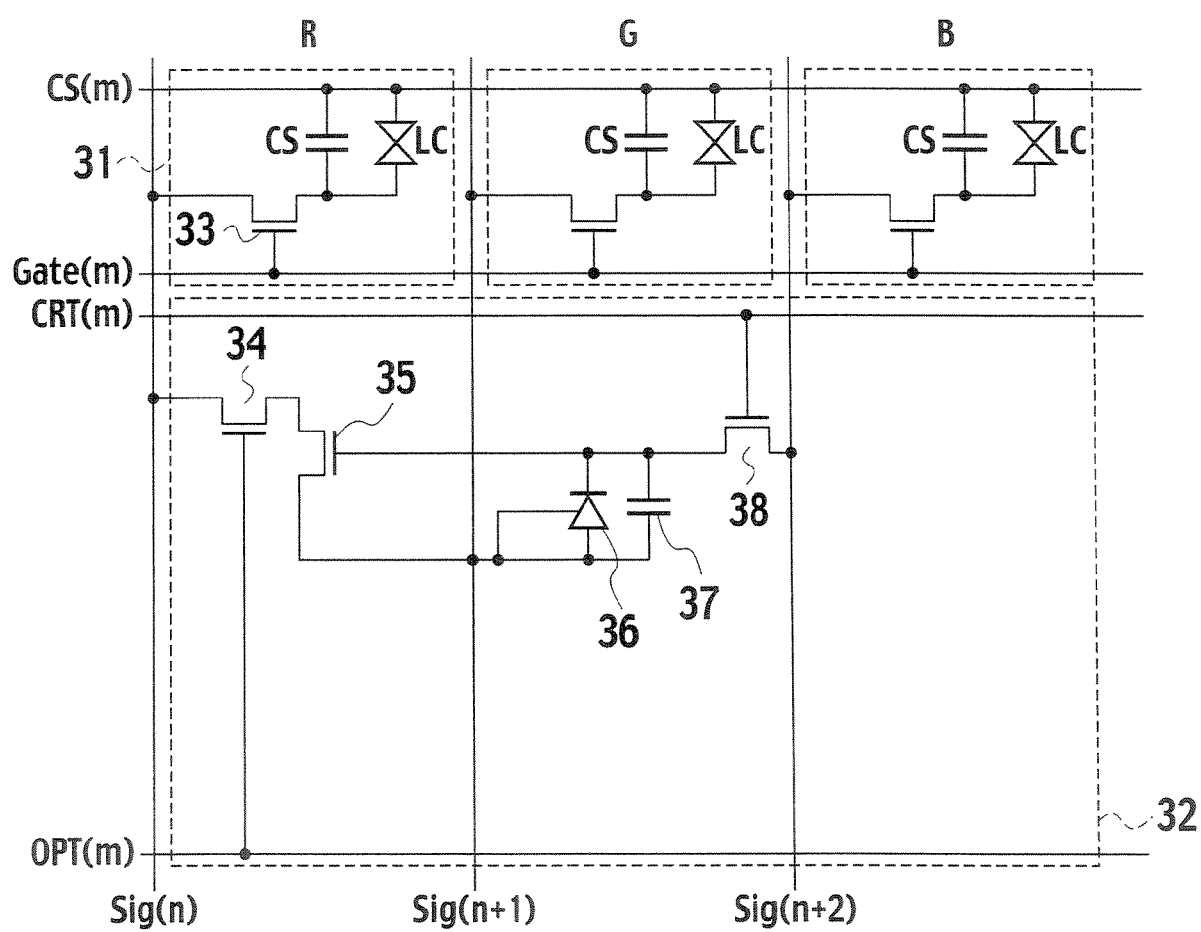
FIG. 2 is a circuit diagram showing a configuration of a pixel of the display device.

FIG. 2 is a circuit diagram showing a configuration of a pixel of the display device shown in FIG. 1. In the display unit 2, subpixels of red (R), green (G) and blue (B) are regularly arranged, and one pixel is composed of a set of one red subpixel, one green subpixel and one blue subpixel. Each of the subpixels includes a display circuit 31 having a switching element 33, a liquid crystal capacitance LC and an auxiliary capacitance CS.

In FIG. 2, Gate (m), Sig (n) and CS (m) denote a scan line, a signal line and an auxiliary capacitance line, respectively. Each switching element 33 is an MOS type. A gate of the switching element 33 is connected to the corresponding scan line, and a source thereof is connected to the corresponding signal line. A drain thereof is connected to one end terminal of the corresponding auxiliary capacitance LC, and also to the corresponding liquid crystal capacitance CS. The other end terminal of each auxiliary capacitance LC is connected to the corresponding auxiliary capacitance line.

An image signal is transmitted from the host side through the signal line. When the switching element 33 is turned ON in response to a scan signal transmitted to the scan line, the transmitted image signal is given to the auxiliary capacitance CS and the liquid crystal capacitance LC through the switching element 33, and is then used for display.

In the display unit 2, a photosensor circuit 32 including a photosensor 36, a sensor capacitance 37, an output control switch 34, a source follower amplifier 35 and a precharge control switch 38 is provided to each set of three subpixels of R, G and B. Here, as an example of the photosensor 36, a PIN type photodiode is used.

The photosensor 36 and the sensor capacitance 37 are connected in parallel. Both of the photosensor 36 and the sensor capacitance 37 are connected to the signal line Sig (n) of the red subpixel through the source follower amplifier 35 and the output control switch 34. And both of the photosensor 36 and the sensor capacitance 37 are connected to the signal line Sig (n+2) of the blue subpixel through the precharge control switch 38.

ON/OFF of the output control switch 34 is controlled by using a signal transmitted through a control line OPT (m). ON/OFF of the precharge control switch 38 is controlled by using a signal transmitted through a control line CRT (m).

It should be noted that the display circuit 31, the photosensor 36 and the sensor capacitance 37 are respectively equivalent to the image display unit, the optical input unit and the capacitive coupling detector.

Figure 3:
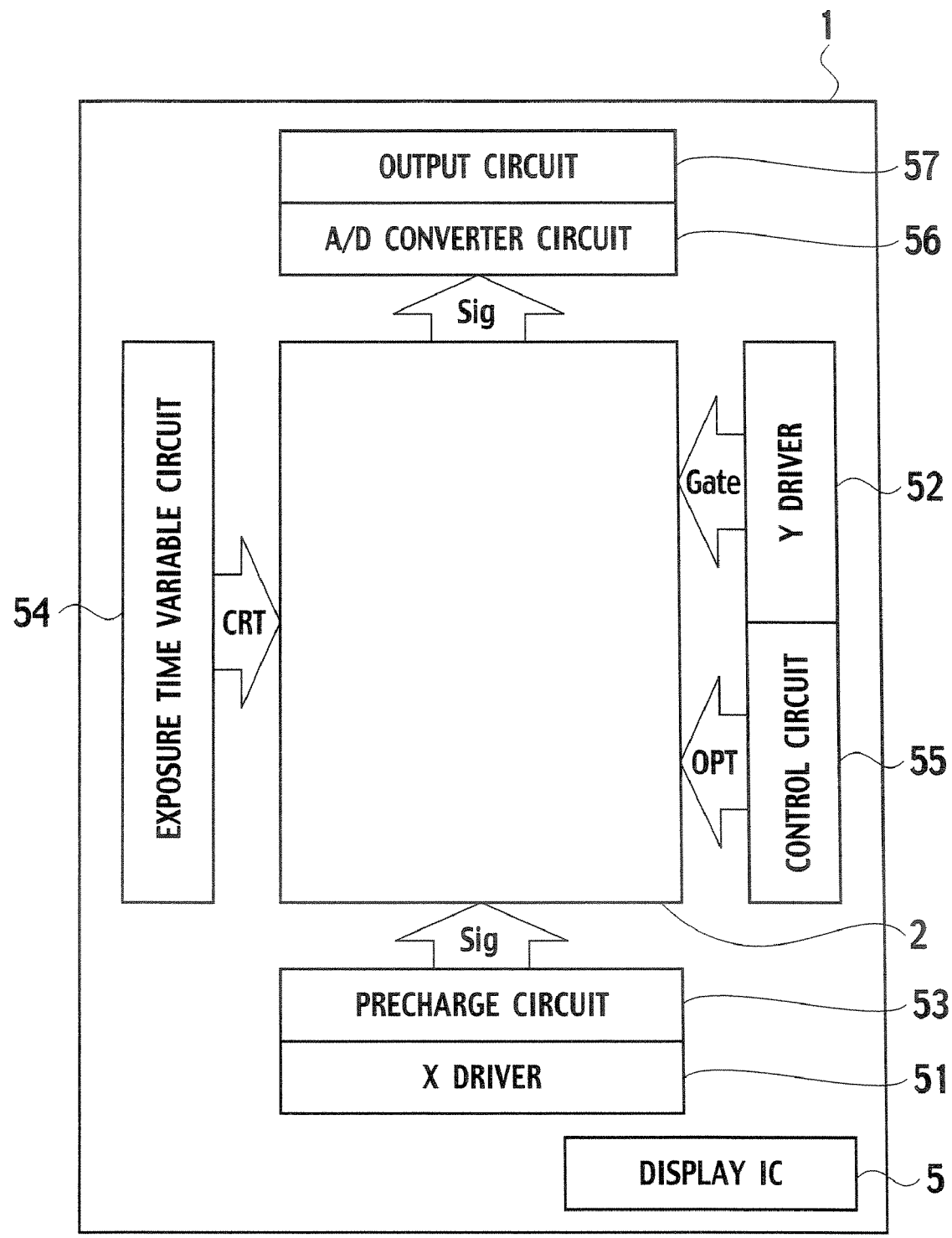
FIG. 3 is a block diagram showing a configuration of a circuit provided on an array substrate of the display device.

FIG. 3 is a block diagram showing a configuration of a circuit formed on the glass substrate of the array substrate 1. As shown in FIG. 3, the display IC 5, an X driver 51, a Y driver 52, a precharge circuit 53, an exposure time variable circuit 54, a control circuit 55, an A/D converter circuit 56 and an output circuit 57 are provided. The X driver 51 controls the signal line arranged in each pixel, and the A/D converter circuit 56 processes an output signal from the photosensor circuit 32.

The X driver 51 outputs an image signal to the signal lines Sig arranged. The Y driver 52 controls ON/OFF of the switching elements 33 arranged in each pixel, through the corresponding scan line Gate. And the Y driver 52 writes, into each pixel, the image signal outputted to the corresponding signal line Sig.

The precharge circuit 53 (a power supply unit) outputs a signal to the signal lines Sig by utilizing a horizontal blanking period during which both of the X driver 51 and the Y driver 52 are not writing an image Thereby, the precharge circuit 53 controls the photosensor circuit 32 of the display unit 2. To be specific, the precharge circuit 53 applies a reference voltage PVSS, which is equivalent to GND of the photosensor circuit 32, to the signal line Sig (n+1) of the green subpixel shown in the circuit diagram of FIG. 2. On the other hand, the precharge circuit 53 applies a precharge voltage Vprc, which is to be used for precharging the sensor capacitance 37, to the signal line Sig (n+2) of the blue subpixel. Ed the precharge circuit 53 applies a predetermined voltage (5 V) to the signal line Sig (n) of the red subpixel. The precharge voltage Vprc and the reference voltage PVSS oscillate in the same phase, for example, with a frequency of 50 Hz and an amplitude of ±0.5 V.

The exposure time variable circuit 54 controls the control lines CRT so as to turn ON and OFF the precharge control switches 38 arranged in the respective pixels. Thereby, the exposure time variable circuit 54 writes, into each sensor capacitance 37, a signal outputted to the corresponding signal line Sig by the precharge circuit 53.

The control circuit 55 controls the control lines OPT so as to turn ON and OFF the output control switches 34 arranged in the respective pixels. Thereby, the control circuit 55 gives an output of each photosensor circuit 32 to the corresponding signal line Sig.

Figure 4:
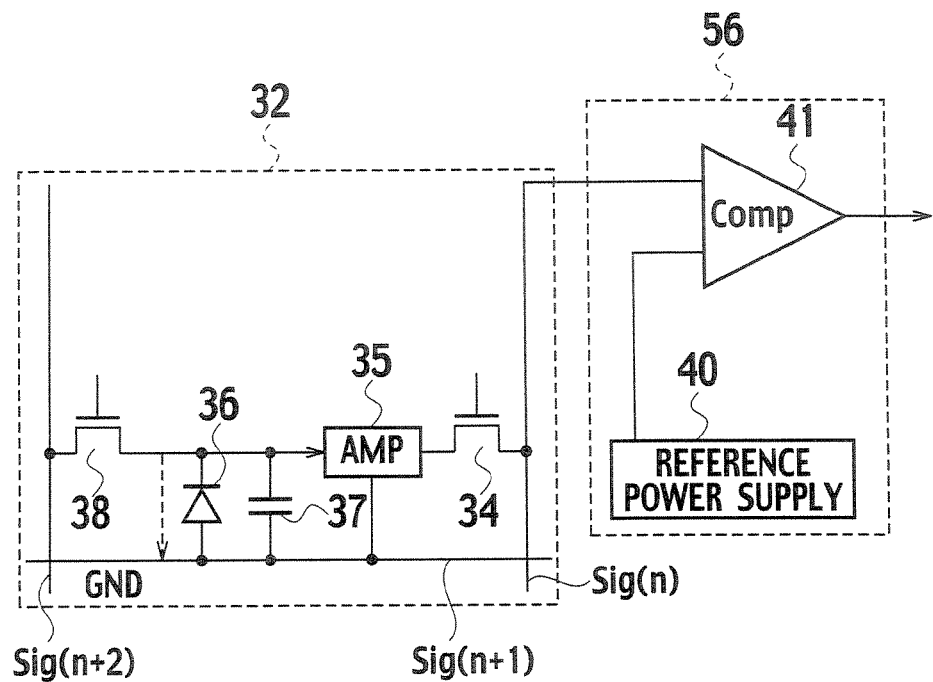
FIG. 4 is a circuit diagram showing a configuration of an optical sensor circuit and an A/D converter in a pixel.

The A/D converter circuit 56 converts a signal outputted by the photosensor circuits 32 through the signal lines Sig into a digital signal. The output circuit 57 outputs the converted digital signal to the sensor IC 6. To be specific, as shown in a circuit diagram of FIG. 4, a comparator 41 of the A/D converter circuit 56 compares the potential of the signal line Sig (n) of the red subpixel with the reference potential of a reference power supply 40. Then, in a case where the potential of the signal line Sig (n) is larger than the reference potential, the A/D converter circuit 56 outputs a high-level signal. On the other hand, in a case where the potential of the signal line Sig (n) is smaller than the reference potential, the A/D converter circuit 56 outputs a low-level signal.

Figure 5:
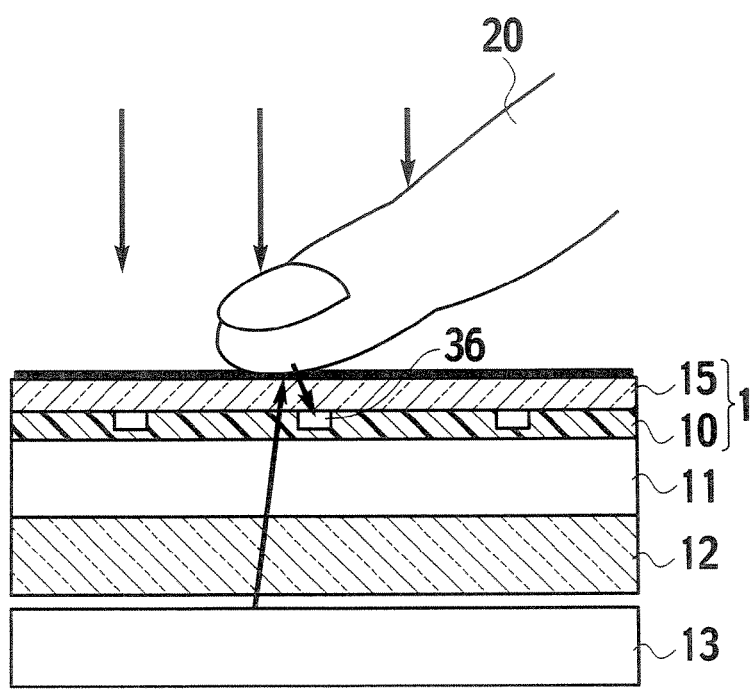
FIG. 5 is a cross sectional diagram showing a configuration of a display unit in the display device.

FIG. 5 is a cross sectional view showing a configuration of the display unit 2. On the glass substrate 15 of the array substrate 1, the photosensors 36 and the like are formed in the respective pixels, and an insulating layer 10 is formed so as to cover them. A liquid crystal layer 11 is formed between the array substrate 1 and an opposite substrate 12 which is made of glass, and which is arranged so as to be opposed to the array substrate 1. A back light 13 is arranged on the outer side of the opposite substrate 12. As shown in FIG. 5, two kinds of light enter the photosensors 36. One kind of the light is ambient light that is not blocked by an object 20 such as a finger. The other is light which is emitted from the back light 13, and which then is reflected by the object 20. The glass substrate 15 is arranged in the front surface of the display device so as to facilitate capacity coupling of the object 20 to the sensor capacitance 37. It is preferable to use a film having a low dielectric constant as an optical film such as a polarizing plate. If a protective plate is provided on the front surface of the display unit 2, a transparent insulating material having a low dielectric constant is used.

Hereinafter, descriptions will be given of an operation of the photosensor circuit 32.

Figure 6:
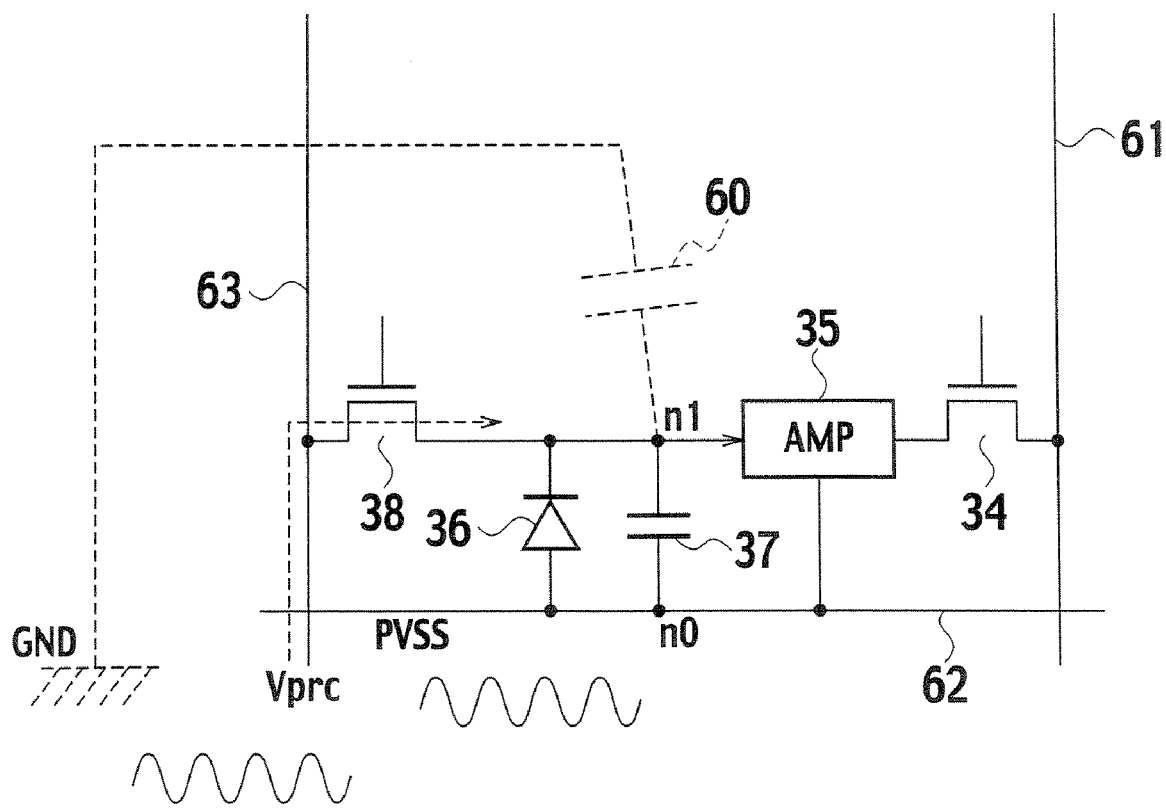
FIG. 6 is a circuit diagram showing a photosensor circuit in a pixel.

FIG. 6 is a circuit diagram showing a configuration of the photosensor circuit 32 of the display device of the present embodiment. The photosensor 32 operates by utilizing the horizontal blanking period during which the display circuit 31 is not performing an image writing operation. The reference voltage PVSS oscillating with a constant frequency is applied to a signal line 62, and the precharge voltage Vprc oscillating in the same phase as that of the reference voltage PVSS is applied to a signal line 63. Subsequently, the precharge control switch 38 is turned ON. Thereby, the precharge voltage Vprc is applied to the sensor capacitance 37 from the signal line 63 through the precharge control switch 38. If a leakage current occurs in the photosensor 36 according to the amount of light entering the photosensor 36 in a predetermined exposure time, the potential of the sensor capacitance 37 changes.

After the signal line 61 is precharged to 5 V, the output control switch 34 is turned ON, so that the source follower amplifier 35 is electrically connected to the signal line 61. Since the sensor capacitance 37 is connected to the gate of the source follower amplifier 35, the voltage on the signal line 61 changes according to a residual voltage on the sensor capacitance 37. When the residual voltage on the sensor capacitance 37 is high, a voltage drop on the signal line 61 increases. On the other hand, when the residual voltage on the sensor capacitance 37 is low, the voltage drop on the signal line 61 decreases.

Thereafter, by comparing the voltage value of the signal line 61 with the reference potential of the reference power supply 40, the amount of light having entered each photosensor 36 can be measured in the A/D converter circuit 56. The amount of light having entered each pixel is converted into a digital signal in the A/D converter circuit 56, and the resultant digital signal is inputted to the sensor IC 6 through the output circuit 57. The sensor IC 6 can obtain data on a picked-up image from the amount of light having entered each pixel.

The sensor IC 6 generates a differential image by calculating the difference between the obtained data on the picked-up image and data on a previously picked-up image stored in a memory. By analyzing the differential image, the sensor IC 6 can determine the coordinates to which the finger is adjacent, and can also determine whether or not the finger is in contact.

Figure 7A:
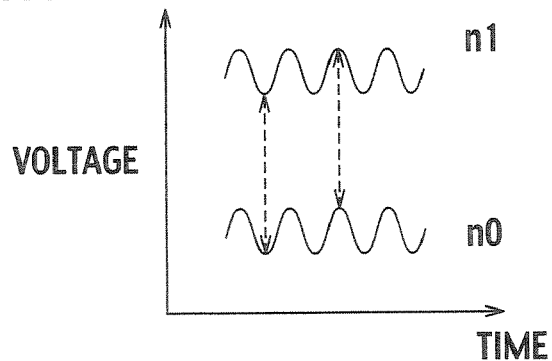
FIG. 7A is a graph showing waveforms respectively of a precharge voltage and a reference voltage at the time when the magnitude of a capacitive coupling is small.

It should be noted that a capacitance 60 shown in the dotted line in FIG. 6 is a coupling attributable to a fact that the finger of the user is adjacent to the display unit 2. According to the magnitude of this capacitive coupling, the voltage on precharge node n1 of the sensor capacitance 37 changes as shown in graphs of FIGS. 7A and 7B. FIG. 7A is a graph showing the changes in the voltages in a case where the capacitance 60 is small because of a fact that the finger of the user is not in contact with the display unit 2. The precharge voltage Vprc and the reference voltage PVSS change with the same amplitude in the same phase. For this reason, regardless of the timing of measurement, the potential difference between the GND node n0 and the precharge node nil of the sensor capacitance 37 is constant.

Figure 7B:
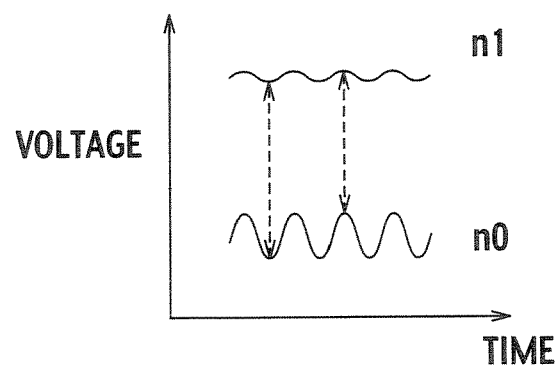
FIG. 7B is a graph showing waveforms respectively of the precharge voltage and the reference voltage at the time when the magnitude of the capacitive coupling is large.

On the other hand, FIG. 7B is a graph showing the changes in the voltages in a case where the capacitance 60 is large because of a fact that the finger of the user is in contact with the display unit 2. In this case, the alternating current component of the precharge voltage Vprc decreases. For this reason, as shown in FIG. 7B, the potential difference between the GND node n0 and the precharge node n1 of the sensor capacitance 37 changes according to the timing at which the output control switch 34 is turned ON. By detecting the changes in the potential difference between the GND node n0 and the precharge node n1 of the sensor capacitance 37 caused by the capacitive coupling, the sensor IC 6 can determine whether or not the finger of the user is in contact.

Figure 8:
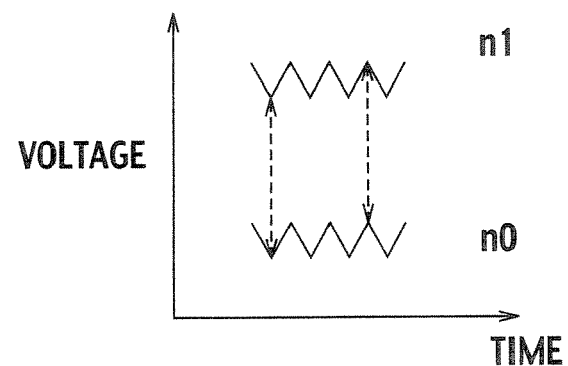
FIG. 8 is a graph showing other waveforms respectively of the precharge voltage and the reference voltage.

It should be noted that the voltages applied as the precharge voltage Vprc and the reference voltage PVSS are not limited to the above-described alternating currents. As long as the potential difference does not change regardless of the timing of measurement, it is possible to employ alternating currents having voltages which have each a triangular wave as shown in FIG. 8 or with a rectangular wave, and which oscillate in the same phase.

Description will be given below of a process for a contact determination.

Figure 9:
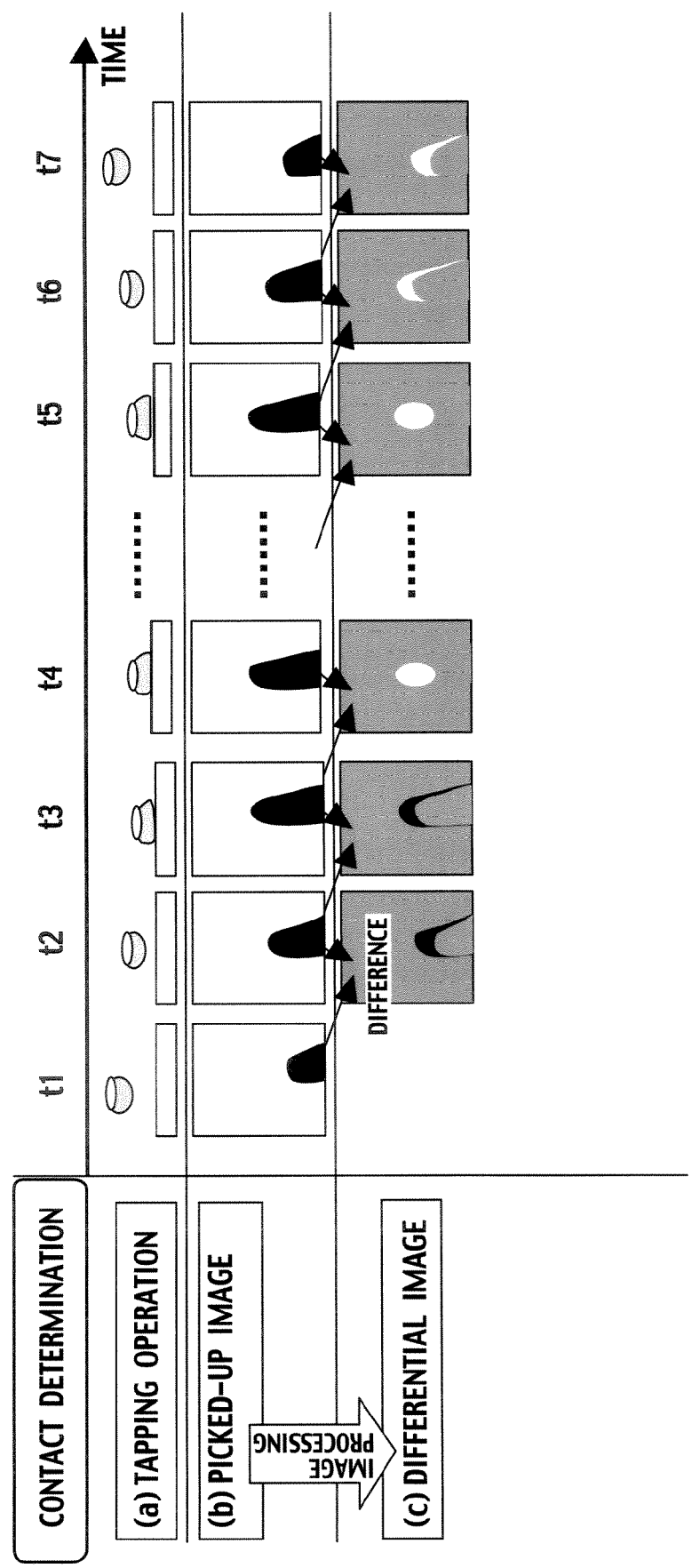
FIG. 9 is an explanatory diagram showing a flow of a process of a contact determination.

FIG. 9 is an explanatory diagram showing a flow of the process for a contact determination. FIG. 9 shows picked-up images and differential images. The picked-up images are obtained in the sensor IC 6 when the user performs a tapping operation on the display unit 2 of the display device. Each of the differential images is an image obtained from the difference between two successive picked-up images which are captured respectively at two different times. In each differential image, a portion where there is no movement is expressed in halftone, and a portion where there is a movement is expressed in black or white. As can be seen from the differential images shown in FIG. 9, a region where the finger of the user touches the display unit 2 can be obtained in each differential image, not only when the finger moves, that is, the finger of the user is approaching or drawing apart from the display unit 2, but also when the finger of the user is in contact with the display unit without any actual movement.

This is because of the following reason. When the finger of the user touches the display unit 2, the capacitive coupling of the sensor capacitance 37 to the finger changes the potential difference between the GND node n0 and the precharge node n1 of the sensor capacitance 37, and thereby the measured potential difference changes according to the timing of measurement. The measured output value of the photosensor circuit 32 in a portion touched by the finger becomes smaller or larger than that of the reference power supply 40 of the LID converter circuit 56 according to the timing of measurement. Accordingly, the change of the output value appears as a change in gradation in the picked-up images. The change in gradation in the picked-up images is extracted by obtaining the difference between two successive picked-up images, and is detected as a region touched by the finger, as shown in some differential images in FIG. 9.

As described above, from the differential images obtained from the picked-up images, the capacitive coupling of the sensor capacitance 37 with the finger of the user is detected by using the precharge voltage Vprc and the reference voltage PVSS oscillating in the same phase. This makes it possible to determine with high accuracy whether or not the finger is in contact. When the finger is in contact with the display unit 2, the finger is fixed onto the display unit 2 even though the duration is only an instant. Accordingly, the coordinates of the contact portion can be obtained by calculating the center of mass in the region obtained, as a region touched by the finger, from each differential image.

Figure 10:
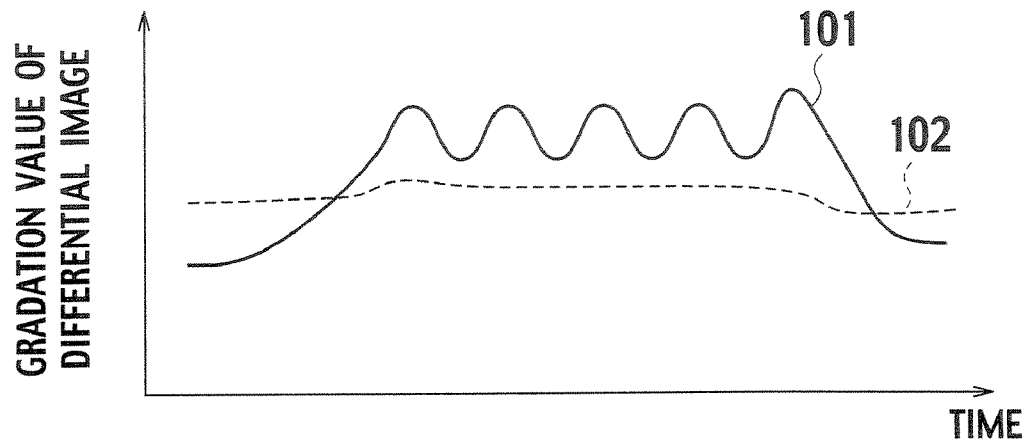
FIG. 10 is a graph showing changes in gradation values of the differential images.

FIG. 10 is a graph showing a change in gradation value of differential images at the time when the finger touches the display unit 2, and also showing a change in gradation value of differential images at the time when the finger is not in contact. In FIG. 10, the solid line 101 indicates the change in gradation value at the time when the finger is in contact, and the dotted line 102 indicates the change in gradation value at the time when the finger is not in contact. When the finger touches the display unit 2, the alternating current component of the precharge voltage Vprc having been applied to the sensor capacitance 37 is eliminated. Accordingly, as indicated by the solid line 101 in FIG. 10, the gradation value of the differential images changes in synchronization with the oscillation cycle of the reference voltage PVSS.

Figure 11:
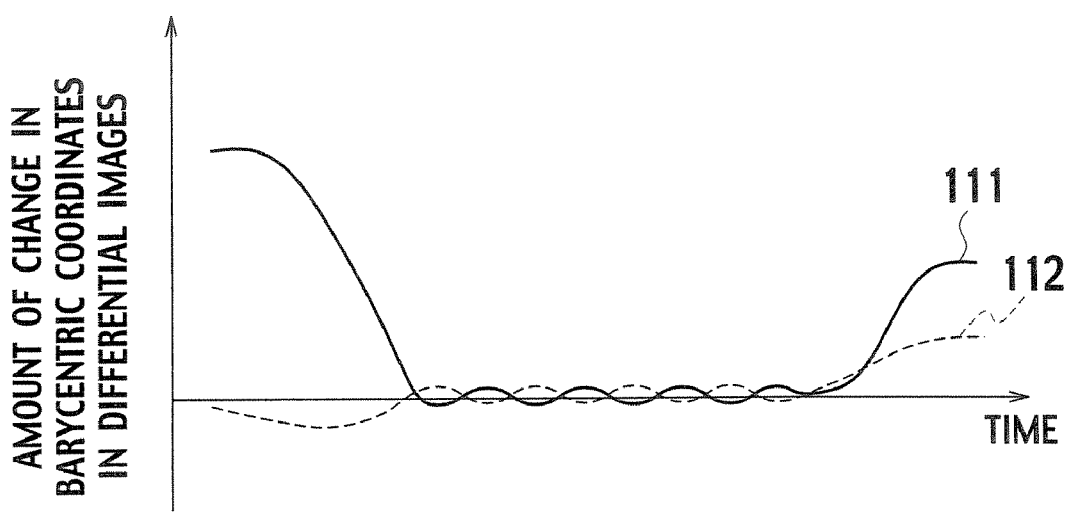
FIG. 11 is a graph showing changes in the barycentric coordinates of figures each appearing in a differential image.

FIG. 11 is a graph showing changes in the barycentric coordinates of figures each appearing in a differential image when the user performs the tapping operation on the display unit 2. The solid line 111 indicates the amount of change in the X coordinates of the barycentric coordinates of the figure. The dotted line 112 indicates the amount of change in the Y coordinates of the barycentric coordinates of the figure. When the finger touches the display unit 2, the finger is fixed onto the display unit 2. For this reason, the amount of change in each of the barycentric coordinates of the figure becomes small. Accordingly, it can be determined that the finger touches the display unit 2 in a case where the amount of change in each of the barycentric coordinates of the figure appearing in the differential images becomes small.

Figure 12:
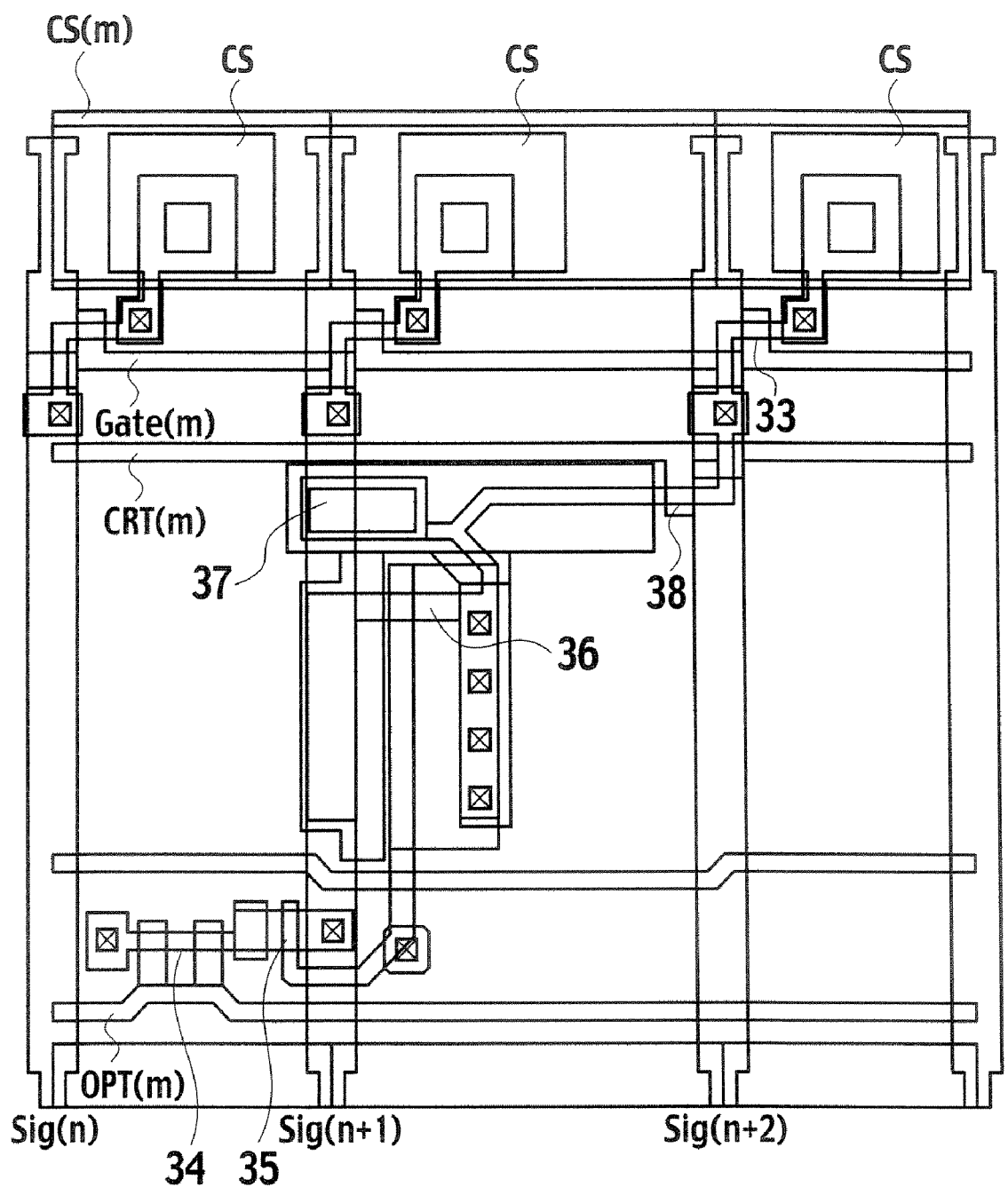
FIG. 12 is a plan diagram showing a configuration of a pixel of the display device.

FIG. 12 is a plan diagram showing the layout of the pixel shown in FIG. 2. The pixel shown in FIG. 12 is composed of a set of one red subpixel, one green subpixel and one blue subpixel in order from left. The length of each side of one pixel is 153 μm. The control switches, the auxiliary capacitances and the like are formed of polysilicon on a glass substrate. The elements forming the photosensor circuit 32, such as the photosensor 36 and the sensor capacitance 37, are not concentrated in a certain color subpixel, but are arranged dispersedly in all the subpixels. For the purpose of uniforming the opening degree of each of the subpixels, the width of each subpixel is adjusted. The sensor capacitance 37 is formed of polysilicon and MoW (molybdenum-tungsten). In the sensor capacitance 37, a closer one of the electrodes to the glass substrate is used as the precharge node n1, and the other one is used as the GND node n0. This configuration makes it easy to achieve the capacitive coupling of the sensor capacitance 37 to the finger.

Figure 13:
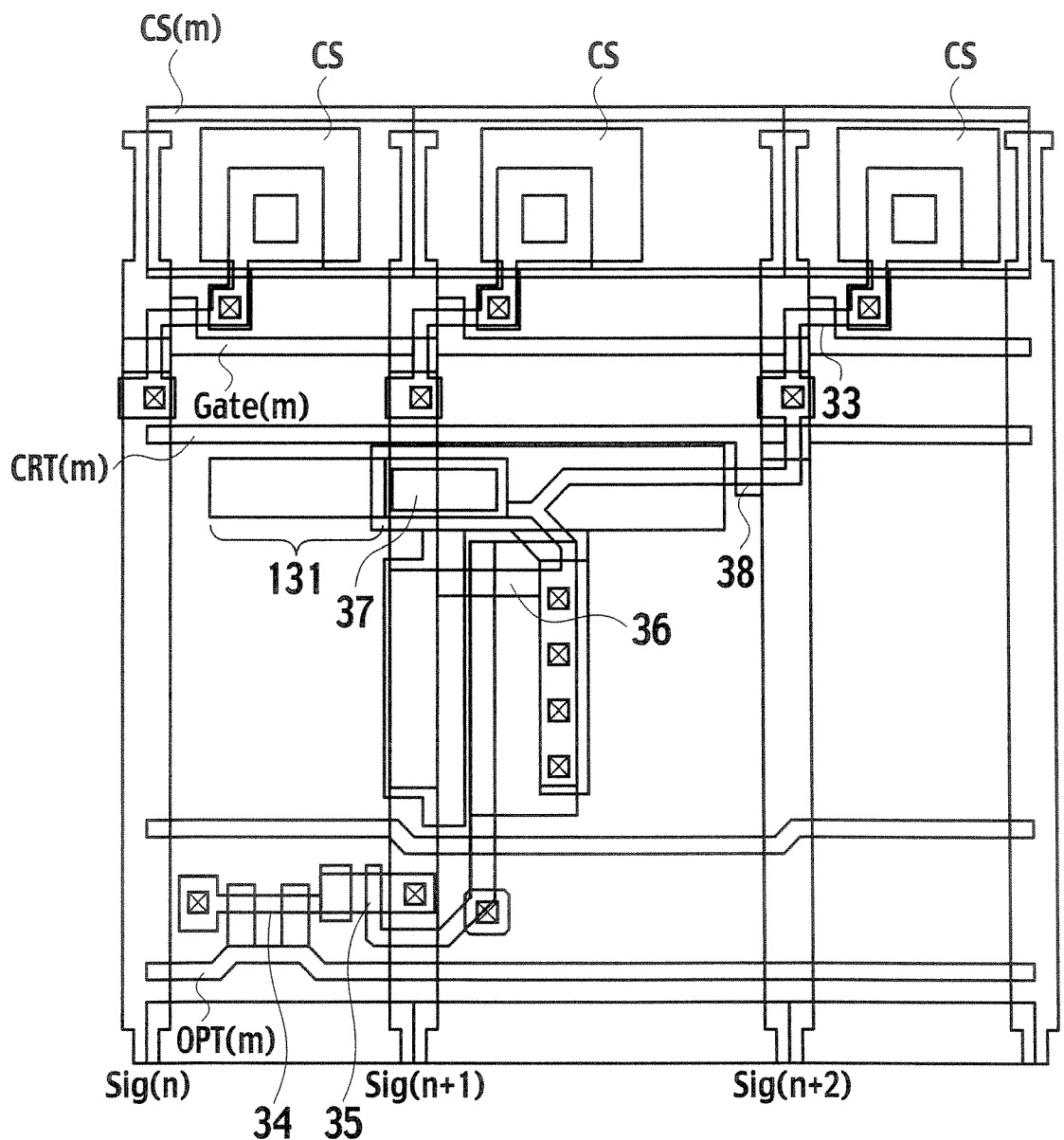
FIG. 13 is a plan diagram showing a configuration of another pixel of the display device.

As shown in a plan diagram of FIG. 13, by extending the electrode of the precharge node n1 of the sensor capacitance 37 as indicated by reference numeral 131, the capacitive coupling of the sensor capacitance 37 to the finger can be more easily achieved. Since polysilicon has a certain degree of transmittance, it is preferable to use polysilicon to form the electrode of the precharge node n1 thus extended.

Figure 14:
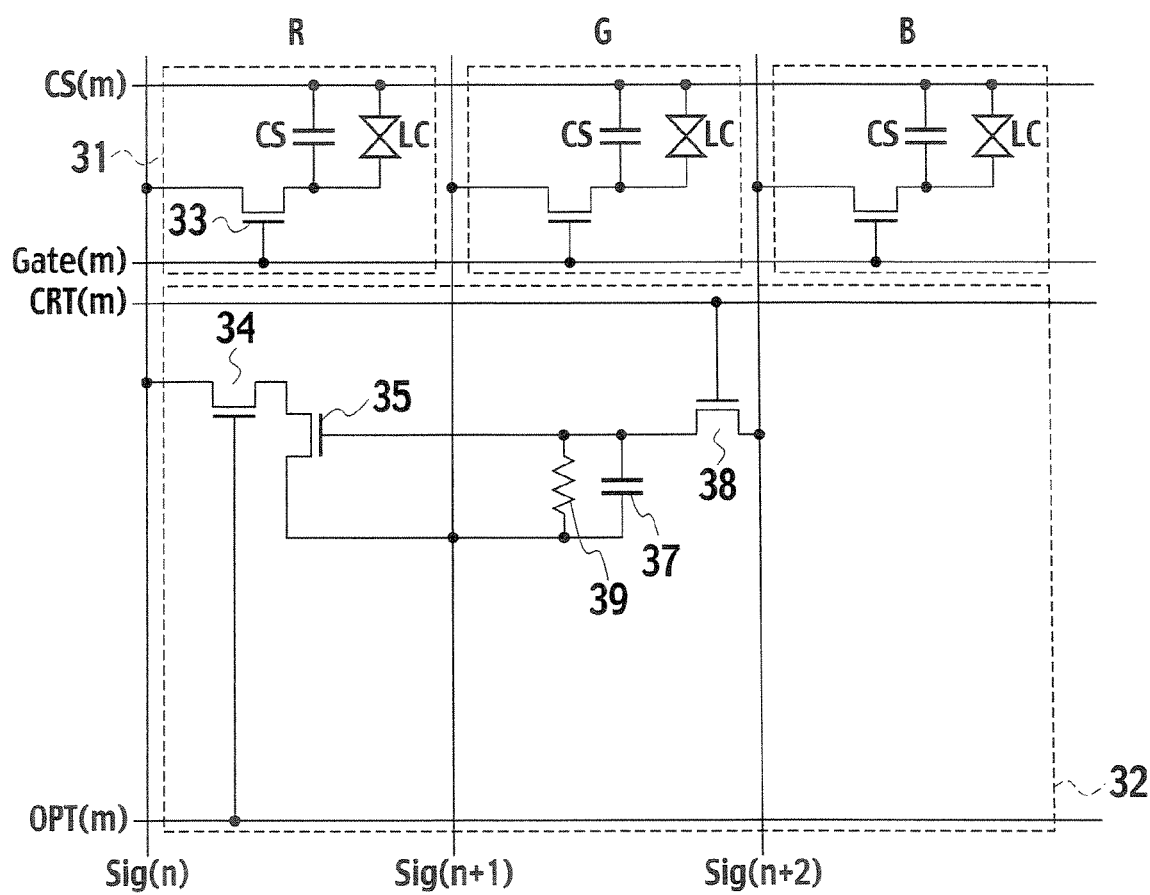
FIG. 14 is a circuit diagram showing a configuration of yet another pixel of the display device.
Figures 15, 16:
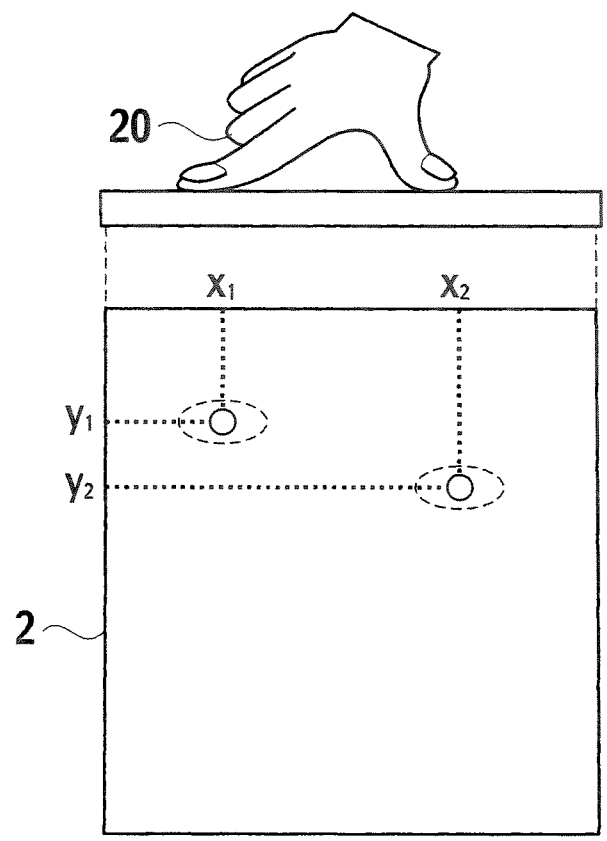
FIG. 15 is a schematic diagram showing an arrangement of pixels of the display device.
FIG. 16 is an explanatory diagram showing a case where a plurality of points on a display unit of the display device are pressed.

FIG. 14 is a circuit diagram showing a configuration of a pixel for detecting capacitive couplings. The pixel shown in FIG. 14 is different from the pixel shown in FIG. 2 in that a resistance element 39 is arranged instead of the photosensor 36. Incidentally, the resistance element 39 can be formed by implanting impurities into polysilicon. Pixels of the display unit 2 may be arranged, for example, as shown in FIG. 15. Specifically, a center pixel 155 of nine pixels is formed as a pixel for detecting capacitive couplings of FIG. 14, and the others are formed as pixels each including the photosensor 36 of FIG. 2. Then, the nine pixels are repeatedly arranged. In this case, the pixels for detecting capacitive couplings may be used for the contact determination, while an image captured by pixels (FIG. 2) each including the photosensor 36 may be used for calculating the coordinates of a contact portion.

As shown in FIG. 16, in a case where the user touches a plurality of points on the display unit 2, differential images for each of the points are obtained, and each of the differential images is characterized by the gradation level in a picked-up image and the capacitive coupling. By performing appropriate processing on each of the obtained differential images, a touch timing and coordinates can be obtained for each of the differential images.

As described above, in the present embodiment, the photosensors 36 are provided to pixels of the display device. The sensor capacitances 37, each of which retains a potential based on the amount of radiated light, are arranged so that the sensor capacitances 37 can be easily coupled with the finger of the user adjacent to the display unit 2. The precharge voltage Vprc of each of the sensor capacitances 37 and the reference voltage PVSS are caused to oscillate in the same phase. With this configuration, it is possible to determine whether or not the finger touches the display unit 2 by detecting a change in the potential difference between the precharge voltage Vprc and the reference voltage PVSS when a finger touches the display unit 2, since the measured potential difference changes according to the timing of measurement. When a finger keeps touching the display unit 2, a portion touched by the finger is detected by using a differential image obtained from picked-up images. For this reason, by calculating the center of mass of the portion, the coordinates of the contact portion can be obtained. Accordingly, in the present embodiment, it is possible to improve accuracy in determining whether or not an object touches the display screen.

It should be noted that, in the above-described embodiment, the contact determination in which it is determined whether or not an object touches the display screen is performed by using a capacitive coupling detected by the capacitive coupling detector, and that the coordinate calculation for calculating the coordinates of a portion touched by the object is performed by using images picked up by the optical input unit. However, it goes without saying that any one of the contact determination and the coordinate calculation may be performed by using both outputs of the capacitive coupling detector and the optical input unit.

What is claimed is:

1. A display device comprising:
an array substrate including pixels, each of the pixels has a sensor capacitance element, and an amplifier which amplifies a signal based on a change in a potential difference between both sides of each of the sensor capacitance element;
an opposite substrate;
a power supply unit configured to apply a precharge voltage and a reference voltage respectively to two electrodes of the sensor capacitance element; and
a processor configured to determine that an object touches a display screen, and concurrently to calculate the coordinates touched by the object, on the basis of the signal amplified by the amplifier,
wherein the reference voltage has voltage values oscillating,
a first electrode of the two electrodes of the sensor capacitance element, which is closer to the object upon touching the display screen, has an area larger than the second electrode of the sensor capacitance element, and
between the sensor capacitance element and the object upon touching the display screen, there are not electrodes.

2. The display device according to claim 1, wherein
the precharge voltage is applied to the first electrodes, the first electrode being formed closer to the object upon touching the display screen.

3. The display device according to claim 1, wherein
one of the two electrodes, to which the precharge voltage is applied, is formed of a light transmissive material.

4. The display device according to claim 1, further comprising:
an optical sensor connected in parallel to the sensor capacitance element,
wherein the potential differences between both sides of each of the sensor capacitance element changes according to an amount of light.

5. The display device according to claim 1, wherein
the pixels include first pixels having the sensor capacitance element connected to an optical sensor in parallel and second pixels have the sensor capacitance element not connected to the optical sensor, and
the first pixels and the second pixels are arranged in a predetermined ratio.

* * * * *